United States Patent
Lopitaux et al.

(10) Patent No.: US 9,223,852 B2
(45) Date of Patent: Dec. 29, 2015

(54) METHODS AND SYSTEMS FOR ANALYZING SEARCH TERMS IN A MULTI-TENANT DATABASE SYSTEM ENVIRONMENT

(75) Inventors: Francois Lopitaux, San Francisco, CA (US); Etienne Giraudy, San Francisco, CA (US); Mark A. Fischer, Ashland, OR (US); Xavier Hosxe, Paris (FR)

(73) Assignee: salesforce.com, inc., San Francisco, CA (US)

( * ) Notice: Subject to any disclaimer, the term of this patent is extended or adjusted under 35 U.S.C. 154(b) by 41 days.

(21) Appl. No.: 13/070,386

(22) Filed: Mar. 23, 2011

(65) Prior Publication Data

US 2011/0307510 A1  Dec. 15, 2011

Related U.S. Application Data

(60) Provisional application No. 61/354,003, filed on Jun. 11, 2010.

(51) Int. Cl.
*G06F 17/30* (2006.01)

(52) U.S. Cl.
CPC ...... *G06F 17/3064* (2013.01); *G06F 17/30867* (2013.01)

(58) Field of Classification Search
CPC .......... G06F 17/30867; G06F 17/3089; G06F 17/3064
USPC .......................................... 707/769, E17.014
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS instranet.com—"Company Overview, Contact, News"—May 24, 2008 Publisher: www.archive.org—pp. 5 URL:http://web.archive.org/web/20080518021817/http://instranet.com/index.asp.

(Continued)

*Primary Examiner* — Shiow-Jy Fan

(74) *Attorney, Agent, or Firm* — Weaver Austin Villeneuve & Sampson, LLP

(57) ABSTRACT

Knowledge base is gaining popularity as a customer support tool. Customers search the knowledge base for solutions to their issues. Keywords searched in knowledge base are analyzed and reports are made available for managers and supervisors to understand the trends and requirements of customers. The number of keywords searched can be extremely large in some organizations. In this specification, storing the keywords in a meaningful way in order to generate report for further analysis is discussed. Efficient data storage helps in managing voluminous data and also reducing the amount of memory required to store the data. Any of the above embodiments can be used independently or together with any combination of other embodiments.

19 Claims, 16 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,230,287 B1* | 5/2001 | Pinard et al. ............... 714/31 |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,377,944 B1* | 4/2002 | Busey et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,711,585 B1* | 3/2004 | Copperman et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,912,486 B2* | 6/2005 | Wang ........................ 702/188 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,130,879 B1 | 10/2006 | Dayon |
| 7,146,416 B1* | 12/2006 | Yoo et al. ................. 709/224 |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,818,194 B2 | 10/2010 | Yoshida et al. |
| 7,827,208 B2 | 11/2010 | Bosworth et al. |
| 7,831,455 B2 | 11/2010 | Yoshida et al. |
| 7,840,413 B2 | 11/2010 | Yoshida et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0046098 A1* | 3/2003 | Kim ........................... 705/1 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |

(56) References Cited

U.S. PATENT DOCUMENTS

| | | |
|---|---|---|
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0036563 A1* | 2/2006 | Wu ................................ 706/59 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0204478 A1* | 8/2009 | Kaib et al. ....................... 705/10 |
| 2009/0276413 A1* | 11/2009 | Uchida ............................ 707/5 |
| 2010/0057677 A1* | 3/2010 | Rapp et al. ....................... 707/3 |
| 2011/0106808 A1 | 5/2011 | Hersans et al. |
| 2011/0218958 A1 | 9/2011 | Warshavsky et al. |
| 2011/0225119 A1 | 9/2011 | Wong et al. |
| 2011/0247051 A1 | 10/2011 | Bulumulla et al. |
| 2011/0276535 A1 | 11/2011 | Pin et al. |
| 2011/0276601 A1 | 11/2011 | Pin et al. |
| 2011/0302098 A1 | 12/2011 | Yoshida et al. |
| 2011/0307510 A1 | 12/2011 | Lopitaux et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

| org_id | related_id | event_type | durantion_enum | as_of_date | channel | related_key_prefix | cummulative count | delta_count |
|---|---|---|---|---|---|---|---|---|
| 48 | 449211 | 3 | d | 1/3/11 | 1 | 2 | 13 | 3 |
| 48 | 449211 | 3 | d | 1/4/11 | 1 | 2 | 15 | 2 |
| 384 | 310934 | 1 | m | 12/1/10 | 1 | 9 | 33 | 17 |
| 48 | 211456 | 2 | m | 12/1/10 | 2 | 4 | 16 | 4 |
| 48 | 901555 | 2 | y | 1/1/10 | 2 | 5 | 331 | 55 |

| Top 10 Search Keywords | |
|---|---|
| Keyword | Sum of Count |
| registration | 50 |
| birds of a feather | 32 |
| lost and found | 24 |
| sessions | 23 |
| dreamforce help | 21 |
| mobile | 21 |
| mobile app | 21 |
| cloud crawl | 20 |
| keynote | 20 |
| map | 18 |

FIG. 11

| Date | Count | Keyword | Channel |
|---|---|---|---|
| 9/23/2010 | 1 | hotel | Internal App |
| 9/24/2010 | 1 | legrand talked to george hu last year | Internal App |
| 10/15/2010 | 2 | boom! | Internal App |
| 10/19/2010 | 1 | lost cell phone | Internal App |
| 10/19/2010 | 1 | lost cell phone | Internal App |
| 10/28/2010 | 2 | when and where is bill clinton speaking? | Internal App |
| 11/2/2010 | 1 | maximizing | Internal App |
| 11/2/2010 | 2 | when is stevie wonder singing? | Internal App |
| 11/3/2010 | 1 | test | Internal App |
| 11/8/2010 | 1 | stevie wonder | Internal App |
| 11/8/2010 | 3 | when is the stevie wonder concert? | Internal App |
| 11/8/2010 | 6 | when is the stevie wonder concert? | Internal App |
| 11/10/2010 | 1 | when is the stevie wonder concert? | Public Knowledge Base |
| 11/10/2010 | 1 | test | Internal App |
| 11/11/2010 | 1 | when is bill clinton speaking? | Internal App |
| 11/11/2010 | 7 | when is the stevie wonder concert? | Internal App |
| 11/12/2010 | 1 | test | Internal App |
| 11/12/2010 | 1 | test | Internal App |
| 11/12/2010 | 2 | when is bill clinton speaking? | Internal App |
| 11/14/2010 | 3 | test | Internal App |
| 11/15/2010 | 3 | when is bill clinton speaking? | Internal App |
| 11/15/2010 | 4 | I'm lost! | Internal App |
| 11/15/2010 | 4 | this is a test tweet - live from salesforce! (looking forward to dreamforce yet? i am...) | Internal App |
| 11/16/2010 | 1 | concert | Internal App |
| 11/16/2010 | 1 | gala | Internal App |
| 11/16/2010 | 2 | are you giving out free expo passes this year? | Internal App |
| 11/16/2010 | 6 | cloudtrigger is looking forward to seeing everyone at dreamforce! stop by booth 406 and say | Internal App |
| 11/16/2010 | 8 | this is a demo tweet, straight from salesforce! | Internal App |
| 11/17/2010 | 1 | @dreamforce when and where is stevie wonder singing? | Internal App |

FIG. 13

METHODS AND SYSTEMS FOR ANALYZING SEARCH TERMS IN A MULTI-TENANT DATABASE SYSTEM ENVIRONMENT

CLAIM OF PRIORITY

This application claims the benefit of U.S. Provisional Patent Application 61/354,003 entitled METHODS AND SYSTEMS FOR ANALYZING SEARCH TERMS IN A MULTI-TENANT DATABASE SYSTEM ENVIRONMENT, by Olivier Y. Pin et al., filed Jun. 11, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. Provisional Patent Application No. 61/354,003 entitled METHODS AND SYSTEMS FOR ANALYZING SEARCH TERMS IN A MULTI-TENANT DATABASE SYSTEM ENVIRONMENT, by Olivier Y. Pin et al., filed Jun. 11, 2010; and U.S. patent application Ser. No. 11/716,365 entitled METHOD AND SYSTEM FOR POSTING IDEAS, by Norimasa Yoshida et al., filed Mar. 8, 2007, which is now Pat. No. 7,831,455; and U.S. patent application Ser. No. 11/786,882 entitled METHOD AND SYSTEM FOR MANAGING IDEAS, by Norimasa Yoshida et al., filed Apr. 13, 2007, which is now Pat. No. 7,818,194; and U.S. patent application Ser. No. 11/801,572 entitled METHOD AND SYSTEM FOR INTEGRATING IDEA AND ON DEMAND SERVICES, by Norimasa Yoshida et al., filed May 9, 2007, which is now Pat. No. 7,840,413; and U.S. Provisional Patent Application No. 61/354,604 entitled METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed Jun. 14, 2010; and U.S. patent application Ser. No. 13/111,195 entitled METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed May 19, 2011; and U.S. Provisional Patent Application No. 61/360,752 entitled METHODS AND SYSTEMS FOR SCORING AND RANKING ARTICLES IN AN ON-DEMAND SERVICES ENVIRONMENT, by Vinodh Rajagopal, filed Jul. 1, 2010; and U.S. patent application Ser. No. 13/082,299 entitled METHOD AND SYSTEM FOR SCORING ARTICLES IN AN ON-DEMAND SERVICES ENVIRONMENT, by Vinodh Rajagopal, filed Apr. 7, 2011; and U.S. Provisional Patent Application No. 61/402,576 entitled METHOD AND SYSTEM FOR PROVIDING SIMPLIFIED FORM FILLING IN AN ON-DEMAND SERVICE, by Nadia Naderi, filed Aug. 10, 2010; and U.S. patent application Ser. No. 13/030,096 entitled METHOD AND SYSTEM FOR PROVIDING SIMPLIFIED FORM FILLING IN AN ON-DEMAND SERVICE, by Nadia Naderi, filed Feb. 17, 2011; and U.S. Provisional Patent Application No. 61/351,620 entitled METHODS AND SYSTEMS FOR PROVIDING ANSWERS TO USERS OF A MULTI-TENANT DATABASE SYSTEM, by Norimasa Yoshida et al., filed Jun. 4, 2010; and U.S. patent application Ser. No. 13/152,246 entitled METHOD AND SYSTEM FOR PROVIDING ANSWERS TO USERS OF A MULTI-TENANT DATABASE SYSTEM, by Norimasa Yoshida et al., filed Jun. 2, 2011; and U.S. Provisional Patent Application No. 61/350,904 entitled METHOD AND SYSTEM FOR ANSWERS TO CASES ESCALATION, by Norimasa Yoshida et al., filed Jun. 2, 2010; and U.S. patent application Ser. No. 13/151,784 entitled METHOD AND SYSTEM FOR ESCALATING CONTENT OF DISCUSSIONS TO PARTICULAR MEMORY LOCATIONS, by Norimasa Yoshida et al., filed Jun. 2, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The specification relates generally to analyzing search terms in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some forms of supporting customers are phone support or email support. With the advent of the web, however, it is essential to provide software-like utility to users as a service. A "software as a service" approach may include a group of end users, who may wish to use the service offering collaboratively, or who may wish to share their input as a community. A database created from collaborative sharing in a community, which in this specification may be referred to as a forum, may be used is as an added tool for customer support. Accordingly, this specification recognizes that is may be desirable to provide techniques enabling sharing ideas to improve service offerings.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 8 shows an embodiment of a knowledge event table.

FIG. 11 illustrates an example of a user activity report.

FIG. 13 illustrates another example of a user activity report.

DETAILED DESCRIPTION

General Overview

Figure 1:
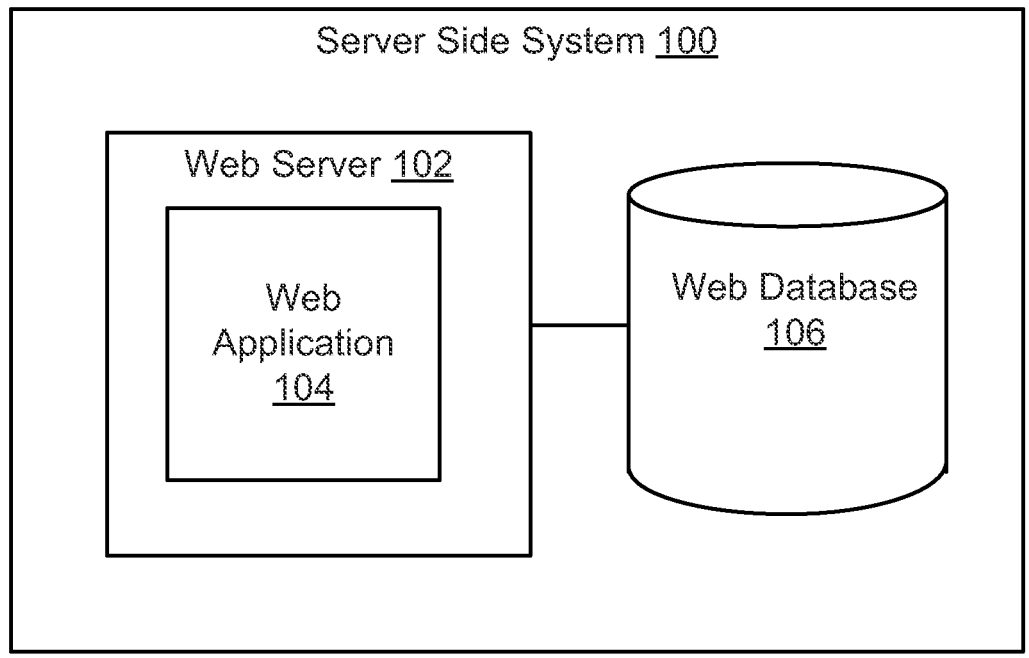
FIG. 1 shows a block diagram of an embodiment of a server system.

Systems and methods are provided for analyzing search terms in a multi-tenant database network system.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

As used herein, the term multi-tenant database system refers to a database system that has multiple tenants that each has a degree of access to at least a portion of the database system that may or may not be the same as the degree of access as other tenants. Each tenant may be an individual or an organization that may have representatives, members, employees, customers and/or other entities associated with the tenant, which in turn may also have different degrees of access to the database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants.

Next, mechanisms and methods for providing methods and systems for analyzing search terms will be described with reference to example embodiments. In this specification a community is a group of users that share a common interest and tend to communicate with one another about that common interest.

A community website is a website in which users share ideas that are related to the community, which may include at least a portion of one or more webpages. An on-demand community is a community website that is created by the tenant using pre-established tools specialized for creating communities. The multitenant database system may provide the pre-established tools specialized for creating the communities. In an embodiment, the focus of the communities may be on-demand enterprise communities, which are communities structured around a business' partners, customers, vendors, representatives, employees, and/or others associated with the business.

A knowledge base is a database for knowledge management. Knowledge bases can be part of community website. Knowledge base is a collection of articles related to problems and solutions related to the common interest of the community. Knowledge base systems may include tools that help in creating, editing and managing the database of articles. Knowledge base systems may offer documentation of knowledge and self-learning there by reducing the cost of customer support.

Analytics in this specification refers to the science of analysis concerned with extracting useful properties of data, typically involving extracting properties from large databases. Search analytics in this specification refers to the analysis and aggregation of search engine statistics. Search analytics may help in understanding and/or improving the performance of search engines. Search analytics may include determining search volume trends, analysis of searches, keywords, advertisements, search volume trends, keyword monitoring, search results, advertisement history, advertisement spending statistics, and/or comparisons of websites, for example. The comparison of websites may include a comparison of the number and/or type of users, advertisers, advertisements, keywords, search results, search trends, advertisement treads, and/or advertisement histories, for example.

In this specification a keyword refers to a word or a phrase relevant to a webpage document, via which the document may be found. Keyword can also be a word or a phrase entered in a search engine. In this specification, the term document is generic to a webpage, an article, or other document. Webpage of results from keyword search in a search engine may also be referred to as search engine results page. Keywords and search terms are used interchangeably in this specification and may be substituted for one another to obtain different embodiments. In this specification the term keyword search analytics refers to the analysis and aggregation of search engine data. Keyword search analytics can be helpful in understanding the trends and requirements of users which in turn helps in optimizing the database.

FIG. 1 shows an embodiment of a server side system 100 in an on-demand database service. In an embodiment, the server side system may host web server 102 and web application 104 and web database 106 among others. In other embodiments server side system 100 may not have all of the elements or features listed and/or may have other elements or features instead of or in addition to those listed.

Server side system 100 may be part of a multitenant system. In an embodiment in a multi-tenant database system, web server 102 sends webpages to user systems (the user systems are described further in conjunction with FIG. 14). Web application 104 includes one or more instructions that cause a processor to render a webpage. Rendering the webpage may involve performing computations, such as retrieving information, which may be in response to user input. Web database 106 is a database associated with web server 102. As a result of implementing web application 104, web server 102 may access web database 106 to store information received from the user system. The web database can reside in a tenant data (which will be described further in conjunction with FIG. 14). Web server 102, as a result of implementing web application 104, may also retrieve from web database 106 that are needed for computations made by web application 104 and/or for rendering a webpage of the website sent to the user system. The information stored in the web database that is necessary for rendering the webpage may include information requested by the user and/or information necessary to fulfill a request of the user that is displayed on the webpage. Web database 106 may store information necessary for rendering webpages associated with websites. In an embodiment, there may be one or more other databases that are separate from web database 106 for storing information that is not directly associated with rendering a webpage.

Figure 2:
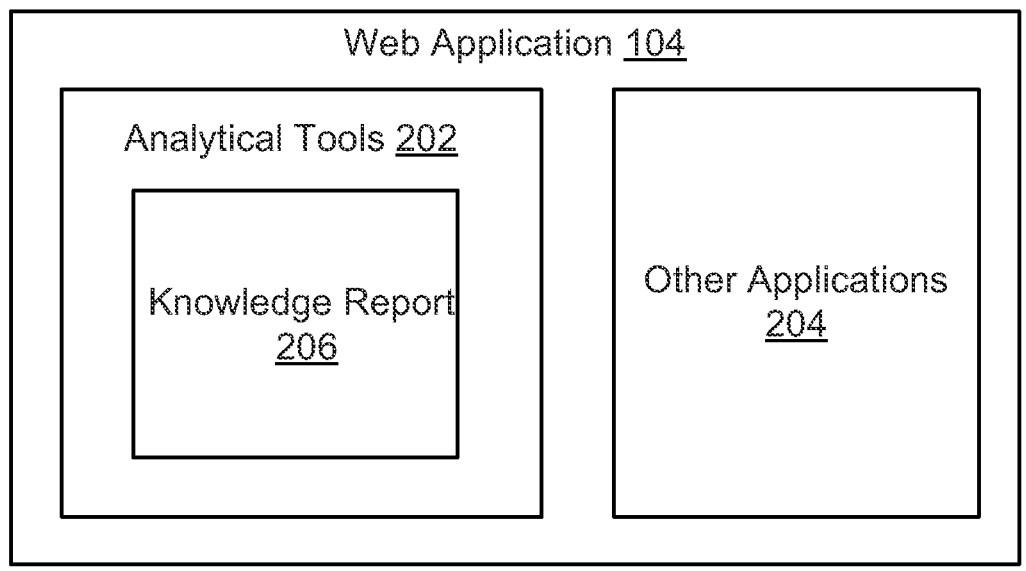
FIG. 2 shows a block diagram of an embodiment of software tools in a multi-tenant database system.

FIG. 2 shows an embodiment of a web application 104. In an embodiment, web application 104 may host analytical tools 202 and other software applications 204. Analytical tools 202 may include knowledge report 206 among other analytical tools. In other embodiments web application 104 may not have all of the elements or features listed and/or may have other elements or features instead of or in addition to those listed.

Software tools for data analysis may be referred to as analytical tools. Analytical tools may be designed for various purposes. Some tools may be customized to support a specific set of related analytical tasks, while some may be built for data analysis. Analytical tools that help in measurement, collection, analysis of data on a webpage may be referred to as web analytical tools. Web analytical tools may also help in measuring the traffic on a webpage, such as by providing useful information such as the number of visitors, page views, and/or other information about traffic on the webpage, which may be helpful in gauging the traffic and trends associated with visitors of the website. Analytical tools 202 may include a software tool for collecting, measuring and/or eventually generating a report for meaningful analysis in a multi-tenant database system. Knowledge report 206 can be a type of analytical tool for generating reports in a knowledge base, which is a database in the multi-tenant system.

Figure 3:
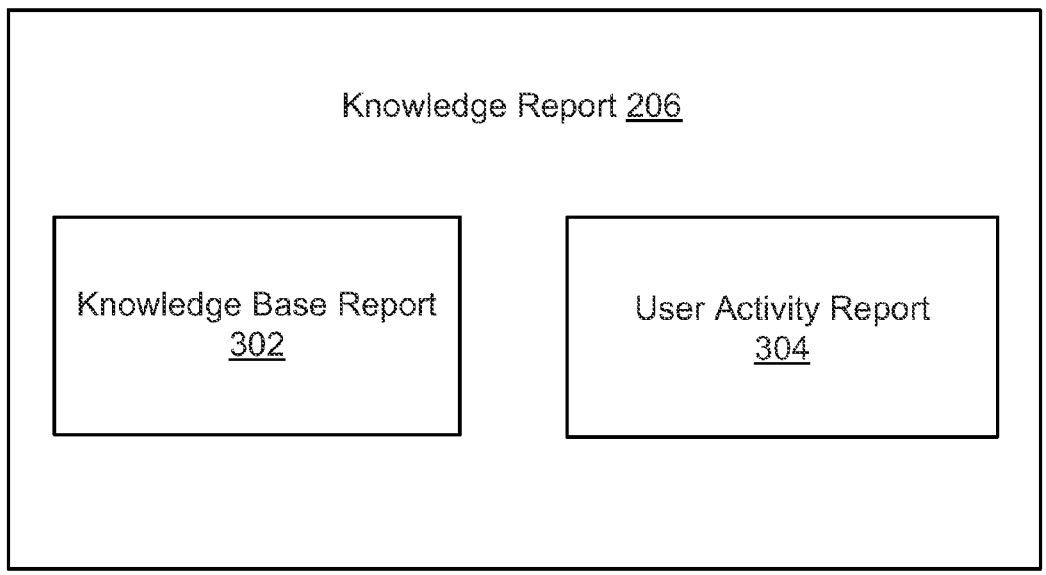
FIG. 3 shows a block diagram of an embodiment of analytical tools.

FIG. 3 shows a block diagram of an embodiment of the knowledge report 206. In an embodiment, the knowledge report 206 may have knowledge base report 302 and user activity report 304. In other embodiments the knowledge report 206 may not have all of the elements or features listed and/or may have other elements or features instead of or in addition to those listed.

Some managers may find it desirable to see and follow activities related to the usage of a customer support system for the employees as well as for the customers. Managers might also want to see the evolution of activities over time. Understanding user voting and viewing articles gives an idea of the effectiveness of the knowledgebase and/or the type of information that the company may want to add to the knowledge base (e.g., by adding links to other documents and/or by adding documents to the knowledge base). Administrators and publishers of articles may also need data to effectively maintain the knowledge base by, for example, associating new keywords with documents already in the system, but that users are not finding and/or removing an association of a document with a keyword that seems to be resulting in people being lead to documents unrelated to the information actually sought.

Continuing with the discussion of FIG. 3, in an embodiment, knowledge base report 302 may include reports related to the current status of the knowledge base as well as other data that is collected from user activity. The data included in each knowledge base report 302 may generally be collected over a predetermined period of time. Knowledge report 206 may generate two types of reports, such as knowledge base report 302 and user activity report 304 among others. Knowledge report 302 may be based on the current status of the knowledge base using current online articles. In an embodiment, drafts and archives are not used to generate reports. In an embodiment, voting information may be included in the knowledge base report. User activity report 304 may be generated from tracking activities, such as viewing, voting, and/or searching on the knowledge base.

Knowledge Base Report

Figure 4:
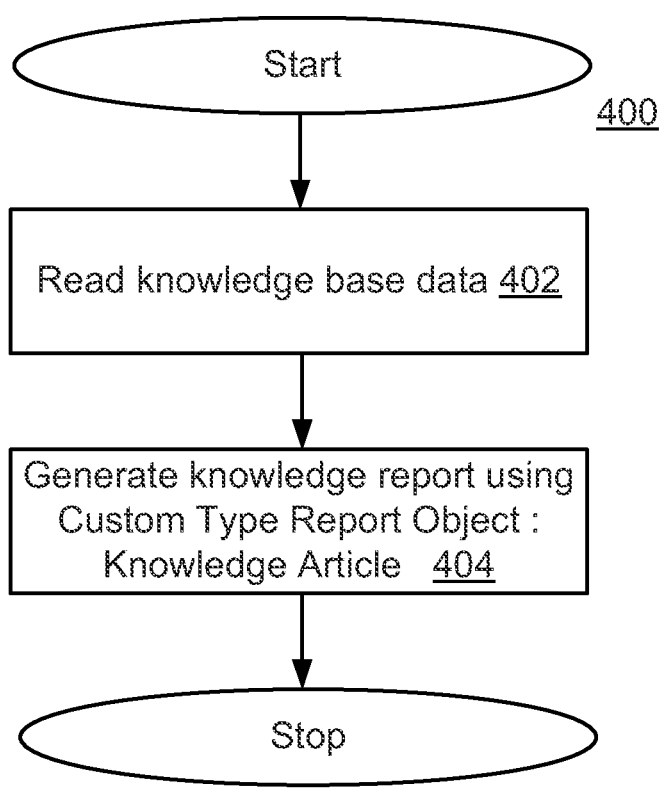
FIG. 4 shows a flowchart of an embodiment of a method of generating a knowledge base report.

FIG. 4 shows a flowchart of an embodiment of a method 400 of generating a knowledge base report (the knowledge base report may be an embodiment of knowledge base report 302). In method 400, the knowledge base report is generated utilizing the data from the knowledge base. In step 402, the method 400 reads (or otherwise receives) data from the knowledge base. During step 402 the data that is read may be the current content of the knowledge base including the title of the article, the number of customer cases associated with the article, the date when the article was first published, the date when the article was last published, the article creation date, who created the article, the date when the article was last modified, who last modified the article, and/or a channel. The channel refers to an access route of to a portion of the knowledge base. User systems may be capable of accessing the knowledge base in many ways and examples of channels include an internal application, a customer portal to the knowledge base, a link from a public knowledge base to the knowledge base, and/or a partner portal to the knowledge base.

In step 404, a knowledge base report can be generated using the current status of the knowledge base and a Custom Report Type (CRT) object, Knowledge Article. CRT objects may be XML files that define relationships between objects, so that the objects can be used to generate reports. The report may include a list of the articles that were most recently published, documents linked to customer cases, and/or documents that are not linked to any customer case among others. By knowing which documents are linked to customer cases, a manager can determine the effectiveness of the customer support system. By knowing which documents are not linked to customer cases, a manager can determine which articles users are not finding useful and/or which articles user do not find despite being relevant to the information sought. By knowing which articles were recently published, the manager can determine which articles are not accessed by users as a result of the article being new rather than as a result of the article not being of interest and/or how quickly after publishing users are able to locate the article.

In an embodiment, each of the steps of method 400 is a distinct step. In other embodiments, method 400 may not have all of the above steps and/or may have other steps in addition to or instead of those listed above. The steps of method 400 may be performed in another order. Subsets of the steps listed above as part of method 400 may be used to form their own method. In other embodiments, there could be multiple instances of method 400.

Figure 5:
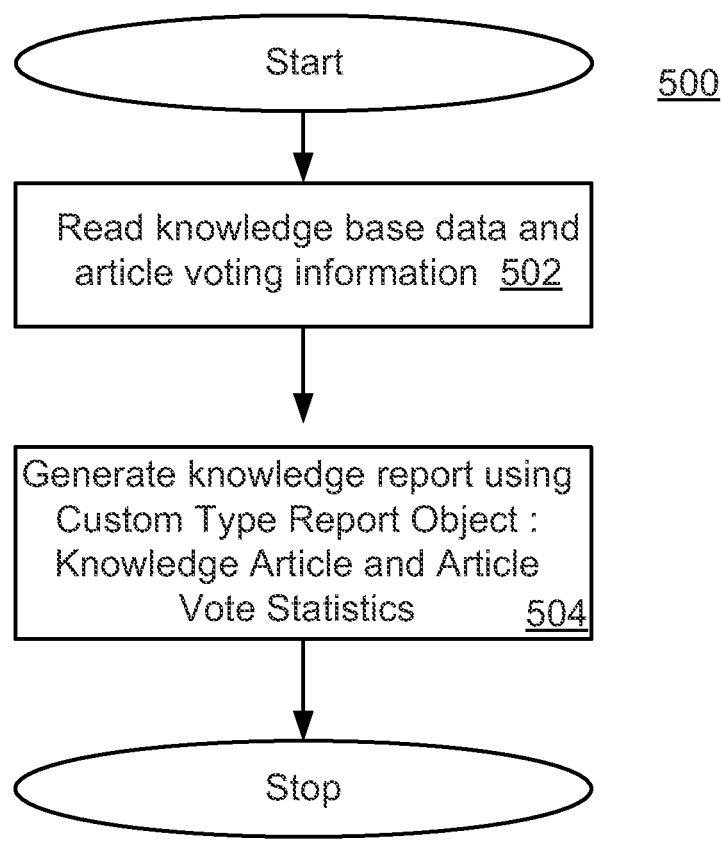
FIG. 5 shows a flowchart of an embodiment of a method of generating a knowledge base report.

FIG. 5 shows a flowchart of an embodiment of a method 500 of generating a knowledge base report, which may be an embodiment of knowledge base report 302. Method 500 utilizes the voting information in the knowledge base in addition to the content of the knowledge base.

In step 502, the report generation method 500 reads the current status of the knowledge base (discussed in conjunction with FIG. 4) and article voting information. In an embodiment, voting information is the data related to voting of articles, which might include a normalized score, channel, total sum, total number of votes, and/or the number of 1 star, 2 stars, 3 stars, 4 stars, and/or 5 stars votes. User systems may be capable of accessing the knowledge base in many ways and channel information indicates the access path to the articles in the knowledge base.

The normalized score may be proportional to the number of views an article receives. In an embodiment, the normalized score ranges from 0 to 100. In an embodiment, an article that is viewed most receives a normalized score of 100 and articles which are not viewed receive a normalized score of 0. For example, if three articles exist in the knowledgebase and the article 'AAA' is viewed 44 times and the article 'BBB' is viewed 32 times and the article 'CCC' is viewed 88 times, then the normalized score of article 'CCC' can be 100. 'BBB' can receive a normalized score of 0 and the article 'AAA' can receive a score of 50. In other embodiments the score may be normalized in other manners. The score may be normalized to be a value between a minimum value that is different than 0 and/or a maximum value that is different than 100. For example, the score may be normalized to be a value between 1 and 10. Voting information may include from which channel the vote came from. Total sum is the total number of points an article has accumulated from voting. In an embodiment, voting involves rating an article from 1 to 5 stars, based on the user system sending a vote liking an article and/or the user system sending an indication as to how many stars to award to the idea. An article that has the highest degree of being liked may be awarded a 5 star vote and least liked will receives 1 star vote. In an embodiment, an article which receives a 5 star vote from the user system is given 10 points, article which receives a 4 star vote from the user system is given 5 points, article which receives a 3 star vote from the user system is given 0 points, article which receives a 2 star vote from the user system is given −5 points and article which receives a 1 star vote from the user system is given −10 points. In an embodiment, the user system liking/disliking an article is not related to the rating an article. Total votes are the total number of votes an article has received since the initial posting of the article in the forum. In an embodiment, the normalized score is related to the number of views and the total votes is total number of votes the article has received. In other embodiment, the choices for how many stars may be awarded to an article may be different. For example, in other embodiments, a user may only be able to choose between 1 to 3 stars or may be able to choose as many as between 1 to 10 stars. Additionally, in other embodiments, the number of points awarded for each star may be different than described above. For example, the points may span between −3 and 3 points, depending on whether the minimum number of stars was awarded or the maximum number of stars was awarded.

In step 504 a knowledge base report can be generated using the current status of the knowledge base and voting information along with Custom Report Type (CRT) objects, 'Knowledge Article' and 'Article Vote Statistics'.

The knowledge report containing voting statistics gives an idea of the quality of the knowledge base and also informs the one reviewing the reports of short comings. In an embodiment, the articles are also given a score of between 1 and 5 that indicates how long it has been since the article was rated. In other embodiments, other ranges of scores may be used, having a different minimum and maximum value, such as −3 to 3 or 0 to 10. The time decay makes the more recent articles to be more relevant than the older ones. Articles that do not receive votes for a longer period of time will have a score closer to 3. The highest rated articles may be listed per channel. In addition to being listed by channel, articles may be sorted according to the number of votes each article received with the highest rated article on the top of the list. Articles that do not receive new votes for a long period of time will be moved from the top highest/lowest list.

Similarly, the lowest rated articles are the articles which receive low scores. The very lowest rated articles are listed per channel and the listing associated with each channel contains articles that are sorted by their vote. The list of the very lowest articles gives an indication that the articles very not judged good by the users. This enables the administrator to make appropriate decisions about the article. Top rated articles with no time decay gives information about how the knowledge base is being used, while, as rated articles with time decay informs about the recent interest of the user system. The article rating may be the average of scores per organization. The report containing the articles with the least number of votes and the articles with the most number of votes is based on the number of votes.

In an embodiment, each of the steps of method 500 is a distinct step. In other embodiments, method 500 may not have all of the above steps and/or may have other steps in addition to or instead of those listed above. The steps of method 500 may be performed in another order. Subsets of the steps listed above as part of method 500 may be used to form their own method. In other embodiments, there could be multiple instances of method 500.

User Activity Report

Figure 6:
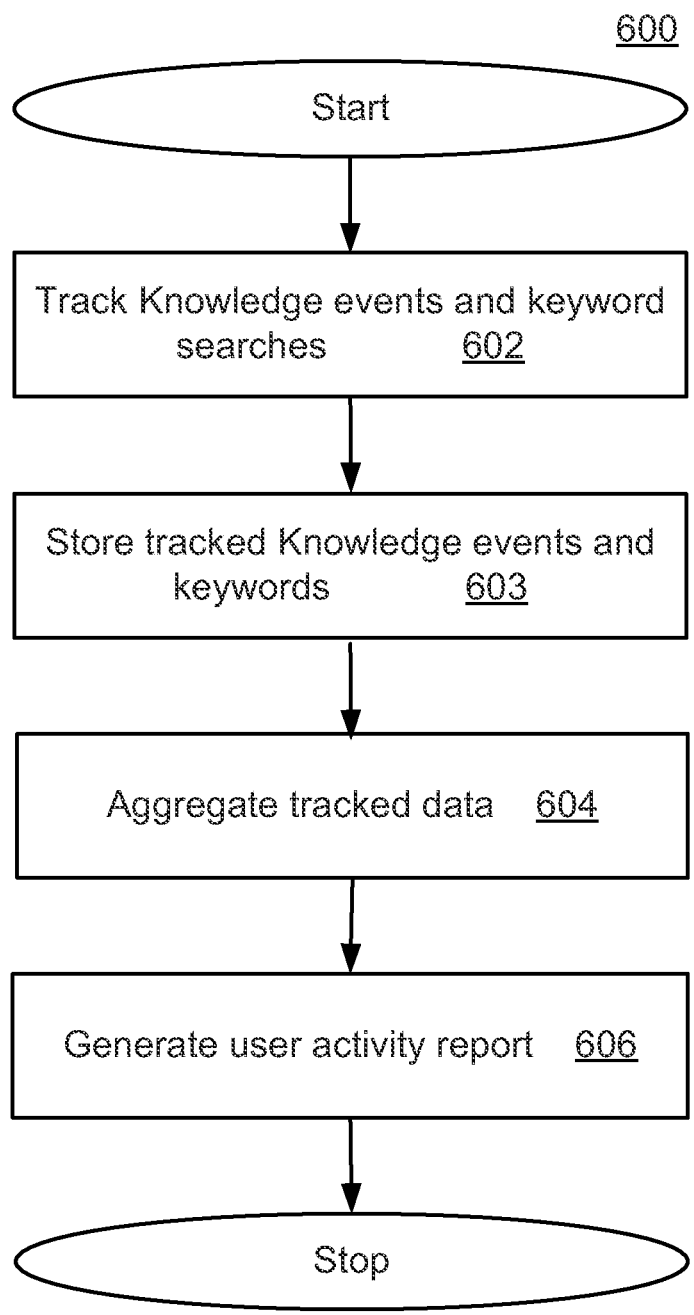
FIG. 6 shows a flowchart of an embodiment of a method of generating a user activity report.

FIG. 6 shows an operational flow diagram illustrating method 600 which is an embodiment of a method for generating the user activity report 304 (as discussed in conjunction with FIG. 3, user activity report 304 is a report of user activity generated from the activities of users, such as viewing, voting and searching by the user system in knowledge base). Step 602 may involve tracking data related to knowledge events such as viewing article, voting on an article, searching for an article, and/or conducting keyword searches in the knowledge base. In step 603 the searched keywords and tracked knowledge events are stored. The tracked data may be stored in a portion of a memory at the host set aside for the users of a tenant, such as the user storage that will be described in conjunction with FIG. 14. The tracked data of knowledge events may be periodically flushed to a database, For example, the data flushed in step 602 may be stored in web database 106. Periodic flushing may be performed every 60 seconds. Tracking is further discussed in conjunction with FIG. 7. Data collected in step 602 may be sifted and only useful data may be stored for long term use.

Step 604 involves aggregating the tracked data. Aggregation will be further discussed in conjunction with FIG. 9. Step 606 involves generating user activity report and will be further discussed in conjunction with FIG. 10.

Tracking

Figure 7:
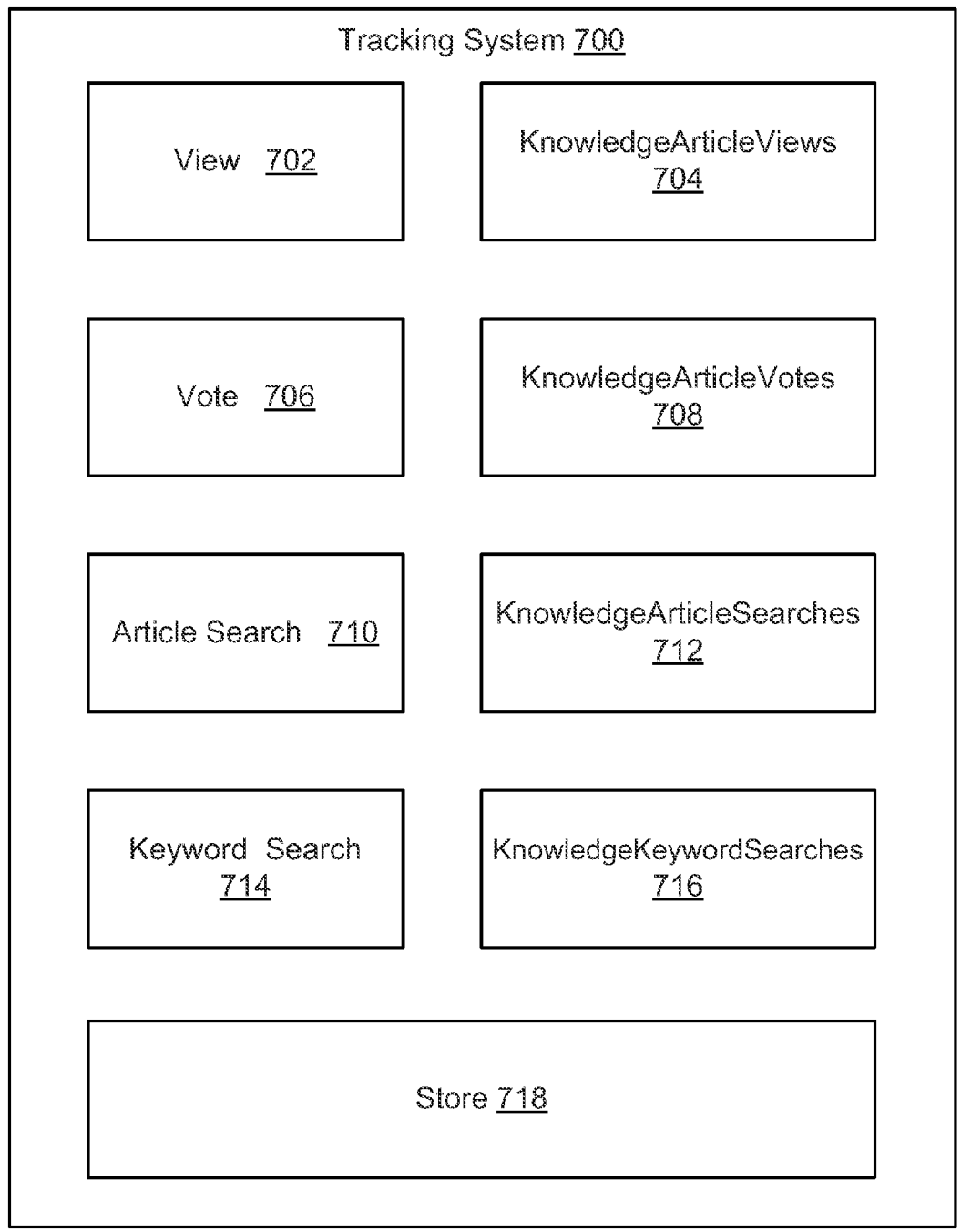
FIG. 7 shows a flowchart of an embodiment of a method of tracking user activity for a user activity report.

FIG. 7 shows a block diagram of an embodiment of a tracking system 700. In an embodiment, tracking system 700 may include view 702, KnowledgeArticleViews 704, vote 706, CRT KnowledgeArticleVotes 708, article search 710, and KnowledgeArticleSearches 712, keyword search 714, KnowledgeKeywordSearches 716 and store 718 among others. In other embodiments tracking system 700 may not have all of the elements or features listed and/or may have other elements or features instead of or in addition to those listed.

Tracking system 700 may track the knowledge events such as the viewing of articles, voting on articles, and the searching the knowledge base, and tracking system 700 may store the knowledge events that were tracked. CRT objects are used to keep track of events in the knowledge base. Tracking may involve keeping count of the number of views, the number of votes, the number of searches along with type of votes, searched words, results of the search and the channels via which the community website is accessed. The results of the search, whether the keyword retrieved an article or not may be stored in Boolean format. View 702 is the portion of code of the tracking system 700 that receive requests to view a page to view an article in the knowledge base. KnowledgeArticleViews 704 is a CRT object, KnowledgeArticleViews that is the portion of code of tracking system 700 used to track knowledge base events when the user system requests an article. When an article from the knowledge base is viewed by the user system from any of the channels, the event is tracked. Vote 706 is the portion of code of the tracking system 700 for receiving a vote on an article from the user system. KnowledgeArticleVotes 708 is CRT object KnowledgeArticleVotes that is the portion of code of the tracking system 700 that is used to keep track of the votes received.

Article Search 710 can be the portion of code of the tracking system 700 via which keywords are received for keeping track of the number of times the keywords are used in searching the knowledge base. KnowledgeArticleSearches 712 is a CRT object KnowledgeArticleSearches that is used to keep track of the number of times a keyword is used in searching the knowledgebase. Keyword Search 714 is the portion of code of the tracking system 700 via which keywords are received for searching the knowledge base. KnowledgeKeywordSearches 716 is a CRT object that is used to keep track of keywords that are searched in the knowledge base and whether the keyword retrieved at least an article or not.

Store 718 can be portion of the code that may be used to temporarily store the tracked data in the memory of the application server (described later in conjunction with FIG. 14) and transferred to web database 106 periodically. The process of transferring to a database is also referred to as flushing. Once the data is flushed, the memory that is used to temporarily store the tracked data is released.

FIG. 8 shows an embodiment of a knowledge event table 800. The data generated from tracking and aggregation (aggregation will be discussed in conjunction with FIG. 9) can be stored in a tabular format such as knowledge event table 800. Knowledge event table 800 may include columns org_id 802, related_id 804, event_type 806, duration_enum 808, as_of_date 810, channel 812, related_key_prefix 814, cumulative_count 816, delta_count 818, and rows 820. In other embodiments, knowledge event table 800 may not have all of the elements or features listed and/or may have other elements or features instead of or in addition to those listed. Org_id 802, which is a shorter form of organization_id, may be the first column of the knowledge event table and may be the identifier that uniquely identifies an organization that is a tenant of the multi-tenant database system. Related_id 804 may be the second column and may be the identifier of object related to the tracked event and can be a role_id or an article_id. Article_id is the identifier associated with an article in the knowledge base. Role_id is the identifier associated with the team of the user who triggered the tracking event. Event_type 806 is the element in the third column and can be the type of tracked event that can be at least one of view, search and vote. Duration_enum 808 can be the fourth column in the knowledge event table, which may indicate whether the data stored in the row of the knowledge event table is a daily data, monthly data and/or yearly data. The data from tracking and daily aggregation (which will be discussed in conjunction with FIG. 9) also referred to as daily row may have the value of day in the data field duration_enum. Similarly, monthly row which is the data from monthly aggregation (which will be discussed in conjunction with FIG. 9) may have the value of month in the data field duration_enum and yearly row which is the data from yearly aggregation (which will be discussed in conjunction with FIG. 9) may have the value of year in the data field duration_enum. as_of_date 810, is the table element in the fifth column that is the current date as of midnight. Channel_enum 812 can be the sixth column element of the knowledge event table can be the channel that can give an indication of the origin of the tracking event. Related_key_prefix 814 is listed in the seventh column. As the name suggests, related_key_prefix 814 can store a prefix to related_id 804.

Further discussing knowledge event table 800, cumulative_count 816 can be the eighth column in the knowledge event table that can store the total search count for a given unique key of the knowledge event table. In an embodiment, a composite key is used as the unique key for the knowledge event table which may be (organization_id, event_type, related_id, related_key_prefix, duration_enum, as_of_date, channel_enum). delta_count 818 can be the last column in the knowledge event table. delta_count can be the search count for a unique key during a given period which could be a day in daily row, a month in monthly row or a year in yearly row. During tracking all events whose unique key already exists will update the value of cummulative_count and delta_count for the corresponding row. delta_count is added to cummulative_count to generate new value of cummulative_count and delta_count is reset to zero. A new row is created if the key does not exist. Related_id can hold the value of role_id to store the information about the user who performed an action (view, vote or search) or article_id to store information about on which article the action was performed. When an article is viewed or voted, two rows in the database may be updated, one row where the related_id is the article_id and the second where the related_id is the role_id. However, searching updates only one row as the related_id is the role_id. Rows 820 contain example data of the knowledge event table.

Aggregation

Figure 9:
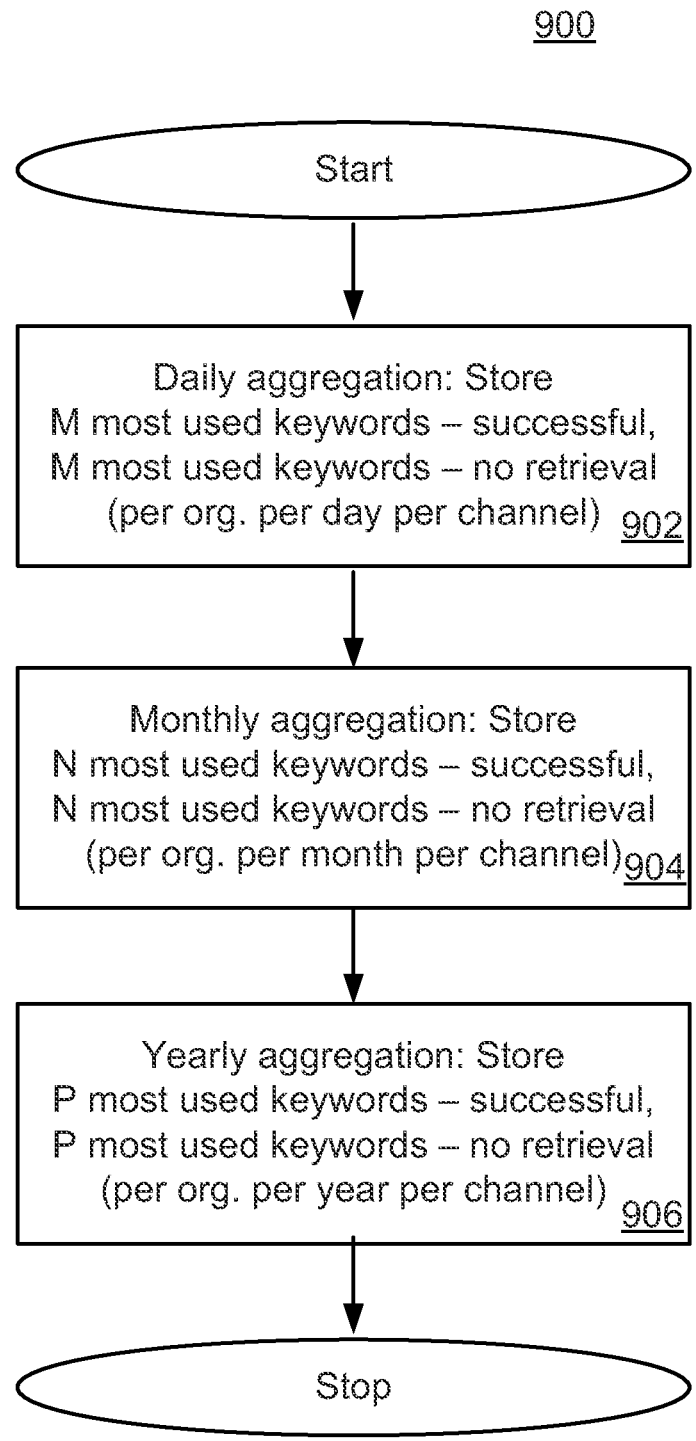
FIG. 9 shows a flowchart of an embodiment of the method of aggregating user activity.

FIG. 9 shows method 900 which is an embodiment of aggregation. Aggregation may be the second step in the process of generating user activity report. Aggregation may include the process of consolidating data collected and stored during step 602, which is the tracking step of the method 600 of FIG. 6.

Storing every searched keyword can lead to large memory requirements. Storing meaningful data can be helpful in managing the memory in a multi-tenant database system. The keywords can be of two categories, keywords that did not retrieve any article and keywords that retrieved at least one article. Keywords that do not yield any results can give an insight into customer requirements and trends which in turn can help in improving the quality of knowledge base. An optimal memory size can be achieved by storing the most frequently used keywords that retrieved results and the keywords that did not retrieve results.

In step 902, day's worth of data with unique key (organization_id, event_type, related_id, related_key_prefix, channel_enum) may create a new entry in the database and data with the key which already exists will update the value of cumulative_count and delta_count for the corresponding row and the value of the duration_enum may be set to 'D'. At a set time, for example at 1 A.M. Pacific Standard Time, the daily aggregation may be performed. In step 902, 'M' number of keywords that were used most often and resulted in a successful search and 'M' number of keywords that were used most often and resulted in no search result may be stored in the database. For example, 'M' can be 300 per day per organization per channel. Older daily data, for example older than 90 days may be deleted from the database.

In step 904 a monthly aggregation may be performed, which may include aggregating the daily data computed for each day of the previous month at a set time. For example, at 1 A.M. Pacific Standard Time on the first of every month, a monthly aggregation may be performed.

In an embodiment, in step 904, a check may be made to determine whether the data from previous months have been aggregated; otherwise all missing monthly aggregate data may be created. Step 904 may involve creating a row for monthly data in the database. In an embodiment, the daily rows of the previous month may be aggregated into one row. In other words, all of the rows of the previous month may be deleted and instead of all of the previous month/s daily rows, one row of monthly data will be placed into the knowledge event table. The data aggregated daily and monthly may have the same set of keys (organization_id, event_type, duration_enum, related_id, related_key_prefix, channel_enum). The field duration_enum may be updated with 'M' (or another value) indicating that the data in that row was aggregated over a period of a month. The as_of_date filed may be updated with the date upon which the aggregation took place. delta_count in the monthly row is the sum of all the delta_count from the daily rows of the month. cummulative_count in the monthly row is the maximum value of cummulative_count encountered in the daily rows.

In step 904, 'N' number of keywords that were used most often and resulted in a successful search and 'N' number of keywords that were used most often and resulted in no search result can be stored in the database. For example, 'N' can be 150 per month per organization per channel. In step 904, older monthly data, for example older than 18 months may be deleted from the database.

In Step 906 a yearly aggregation may be performed. In step 906, monthly data of the last twelve months is aggregated) the monthly values to create yearly data. In an embodiment, the yearly aggregation may be performed to execute at a set date and time. For example, the yearly aggregation may occur at 1 A.M. Pacific Standard Time on the first day of the year.

In step 906, checks are made to ensure that each month's data was aggregated through out the entire previous year; otherwise all monthly yearly aggregate data are created. In an embodiment, a yearly data row is never deleted from the database. Step 906 may involve creating a row for the current year's yearly data in the database. In an embodiment, monthly rows of the previous 12 months with the same key (organization_id, event_type, duration_enum='M', related_id, related_key_prefix, channel_enum) will be aggregated into 1 yearly row. duration_enum may be updated with value 'Y' or another value indicating that the duration of time over which the data of the current row was aggregated was one year. The as_of_date filed may be updated with first day of the previous year. delta_count in the yearly row is the sum of all the delta_count from the monthly rows of the year for the unique key. cummulative_count in the yearly row is the maximum value of cummulative_count encountered in the monthly rows with the unique key. In other embodiments, other aggregations may be performed in addition to or instead of the aggregations listed above. For example, an aggregation may be performed every 10 days and every 100 days in addition or instead of weekly and monthly aggregations.

In step 906, 'P' number of keywords that were used most often and resulted in a successful search and 'P' number of keywords that were used most often and resulted in no search result may be stored in the database. For example, 'P' can be 150 per year per organization per channel.

The aggregation discussed with reference to FIG. 9 can be helpful in controlling the size of the memory required to store the keywords searched and other data associated with the keyword such as the votes, the search results and the viewing data. The stored data can be in the form of a table in the database. In the example discussed to store 300 keywords per day per organization per channel and 150 keywords per month per organization per channel and 90 days of daily data and 18 months of monthly data will result in 249600 rows per organization in 10 years.

90(days)*4(channels)*2(success)*300(keywords)= 216000 daily data rows

18(months)*4(channels)*2(success)*150(keywords)= 21600 monthly data rows

4(channel)*2(success)*150(keywords)=1200 yearly data rows

The number of rows can grow quickly the first three months and after that 1200 new rows may be added every year.

In an embodiment, each of the steps of method 900 is a distinct step. In other embodiments, method 900 may not have all of the above steps and/or may have other steps in addition to or instead of those listed above. The steps of method 900 may be performed in another order. Subsets of the steps listed above as part of method 900 may be used to form their own method. In other embodiments, there could be multiple instances of method 900.

Report Generation

Figure 10:
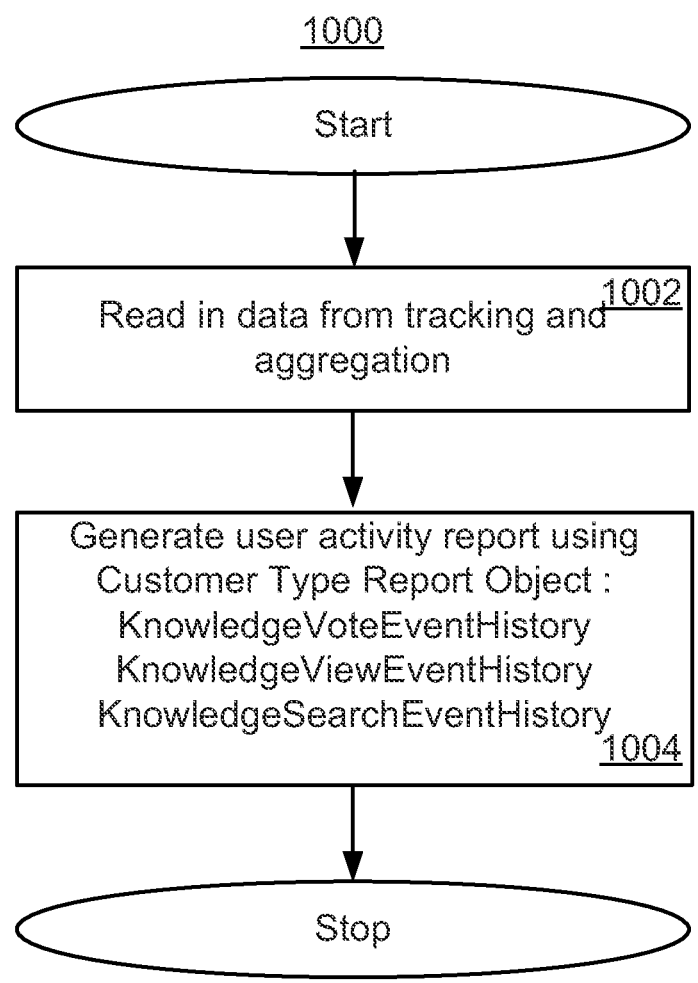
FIG. 10 shows a flowchart of an embodiment of the method of generating a user activity report.

FIG. 10 shows method 1000 which is an embodiment of report generation. Method 1000 illustrates the steps involved in generating a user activity report (discussed in conjunction with FIG. 6). In step 1002, data collected from tracking and aggregation is read in.

In step 1004, CRT objects are used to generate the user activity report. CRT objects can include at least KnowledgeVoteEventHistory, KnowledgeViewEventHistory and KnowledgeSearchEventHistory. In step 1006, a user activity report is generated from the data collected during tracking and aggregation. The user activity report generated may include activities tracked over a period of time. The user system can set the options so that the host system (in response to receiving user instructions) can generate reports in such a manner as to ease analysis. The report may include graphs of voting, activity on the public knowledge base, search activity originating from various channels over a period of time and number of views for an organization for a period of time. Example user activity reports are discussed later in conjunction with FIGS. 11, 12, and 13.

In an embodiment, each of the steps of method 1000 is a distinct step. In other embodiments, method 1000 may not have all of the above steps and/or may have other steps in addition to or instead of those listed above. The steps of method 1000 may be performed in another order. Subsets of the steps listed above as part of method 1000 may be used to form their own method. In other embodiments, there could be multiple instances of method 1000.

Screenshots

FIG. 11 shows screenshot 1100 of an embodiment of a user activity report. Screenshot 1100 may include report title 1102, first column heading 1104, second column heading 1106, first column 1108 and second column 1110. In other embodiments, screenshot 1100 may not have all of the elements listed and/or may have other elements instead of or in addition to those listed.

Screenshot 1100 is an embodiment of a user activity report listing the keywords that were searched the most. Report title 1102 recites the title of the report. In this example, the 10 keywords that were searched the most are listed. First column heading 1104 informs the viewer what content is placed in the first column. In this embodiment, the first column listed in the report are the keywords that were searched. Second column heading 1106 includes the heading of the second column, which is the sum of the count, which refers to the number of times the keyword was searched. First column 1108 lists the most searched keywords. Second column 1110 lists the number of times the keywords were searched.

The user activity report can be presented in at least a graph and may be placed in tabular formats.

Figure 12:
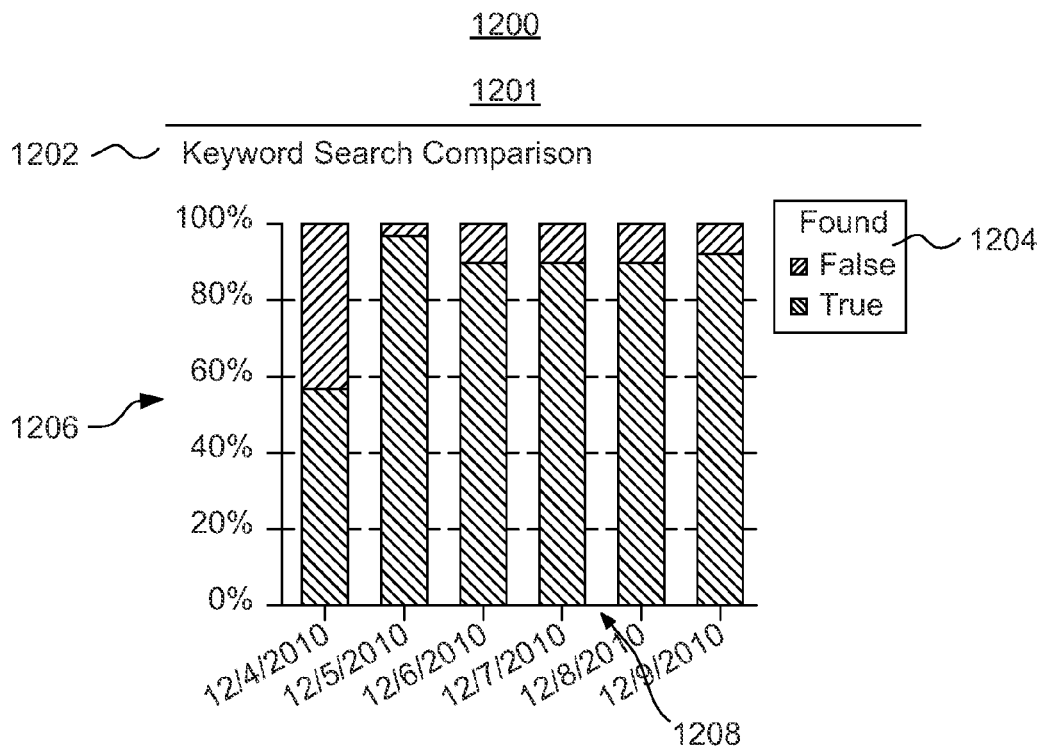
FIG. 12 illustrates an example of a user activity report along with a graphical representation.

FIG. 12 shows screenshot 1200 of an embodiment of a user activity report. Screenshot 1200 may include graph 1201, graph title 1202, table 1203, legend 1204, y-axis 1206, x-axis 1208, report title 1210, first column heading 1212, second column heading 1214, first column 1216 and second column 1218. In other embodiments, screenshot 1200 may not have all of the elements listed and/or may have other elements instead of or in addition to those listed.

Graph 1201 represents the user activity report in a graphical form. Graph title 1202 includes the title of the graph. Legend 1204 describes the representation of the colors in the graph. Graph 1201 is a bar graph of the percentage of successful and unsuccessful keyword searches along y-axis 1206 and date along the x-axis 1208. Graph 1201 gives an indication of the quality of the database.

Table 1203 is a report of keywords that did not retrieve any article and the number of times the keyword was used in searches. Table title 1210 includes the title of the report. First column heading 1212 includes the heading of first column. The second column heading 1214 is the heading of the second column in the report. First column 1216 is a list of keywords that did not retrieve any article when submitted as search terms in a search. Second column 1218 lists the number of times the keyword was entered as a search term.

FIG. 13 shows screenshot 1300 of an embodiment of a user activity report. Screenshot 1300 may include first column 1302, second column 1304, third column 1306, and fourth column 1308. In other embodiments, screenshot 1300 may not have all of the elements listed and/or may have other elements instead of or in addition to those listed.

The embodiment of the user activity report of FIG. 13 lists the keywords that were searched, when the keyword was searched, how many times the keyword was searched, and the channel from which the keyword was searched. First column 1302 lists the date of the search. Second column 1304 lists the number of times the keyword was searched. Third column 1306 lists the keywords that were searched. Fourth column 1308 lists the channel from which the search originated.

System Overview

Figure 14:
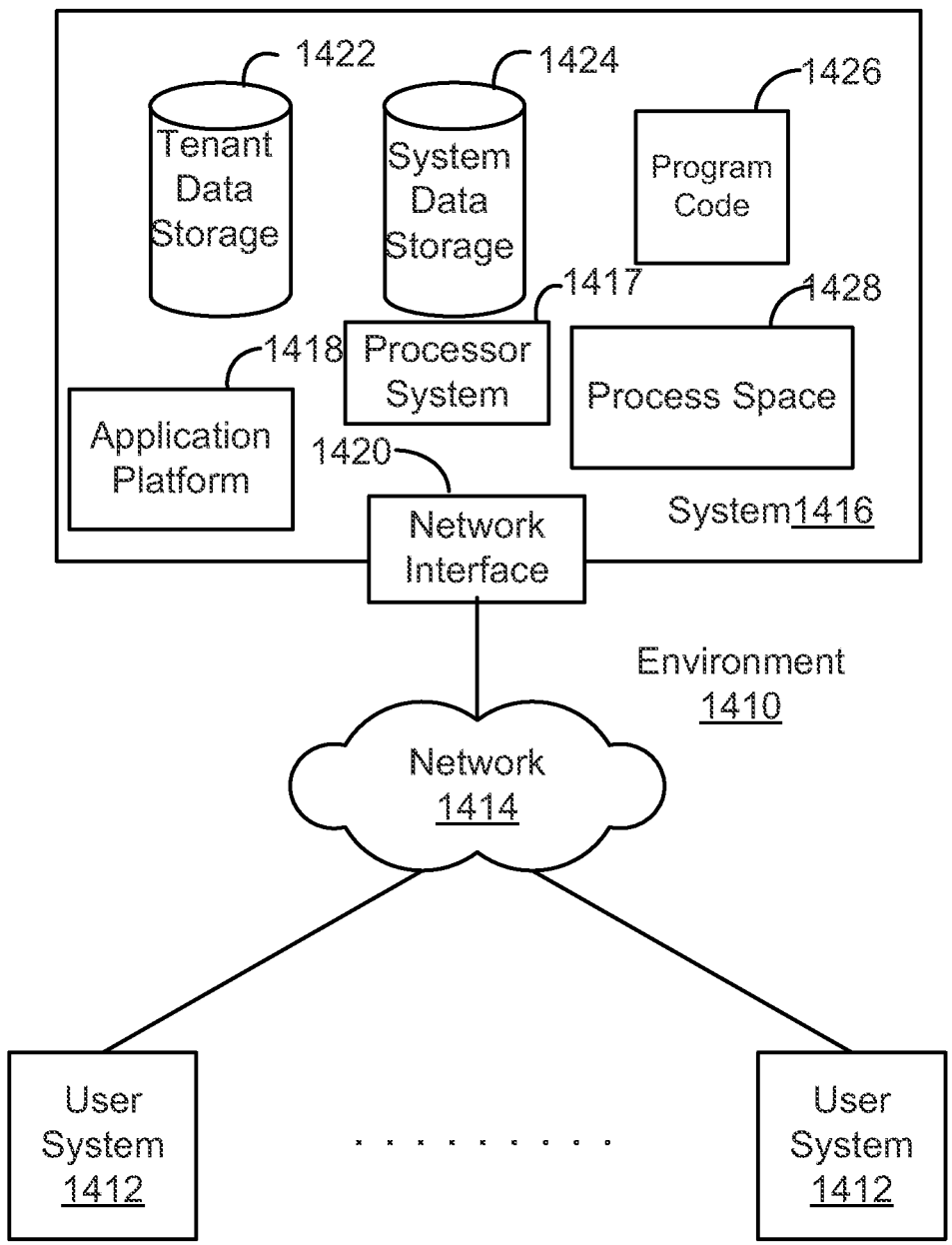
FIG. 14 shows a block diagram of an embodiment of an environment wherein an on-demand database service might be used for method and system for answers to escalation.

FIG. 14 illustrates a block diagram of an environment 1410 wherein an on-demand database service might be used. Environment 1410 may include user systems 1412, network 1414, system 1416, processor system 1417, application platform 1418, network interface 1420, tenant data storage 1422, system data storage 1424, program code 1426, and process space 1428. In other embodiments, environment 1410 may not have all of the components listed and/or may have other elements instead of, or in addition to, those listed above.

Environment 1410 is an environment in which an on-demand database service exists. User system 1412 may be any machine or system that is used by a user to access a database user system. For example, any of user systems 1412 can be a handheld computing device, a mobile phone, a laptop computer, a work station, and/or a network of computing devices. As illustrated in FIG. 14 (and in more detail in FIG. 15) user systems 1412 might interact via a network 1414 with an on-demand database service, which is system 1416.

An on-demand database service, such as system 1416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1416" and "system 1416" will be used interchangeably herein. A database image may include one or more database objects. A relational database management system (RDMS) or the equivalent may execute storage and retrieval of information against the database object(s). Application platform 1418 may be a framework that allows the applications of system 1416 to run, such as the hardware and/or software, e.g., the operating system. In an embodiment, on-demand database service 1416 may include an application platform 1418 that enables creation, managing and executing one or more applications developed by the provider of the on-demand database service, users accessing the on-demand database service via user systems 1412, or third party application developers accessing the on-demand database service via user systems 1412.

The users of user systems 1412 may differ in their respective capacities, and the capacity of a particular user system 1412 might be entirely determined by permissions (permission levels) for the current user. For example, where a salesperson is using a particular user system 1412 to interact with system 1416, that user system has the capacities allotted to that salesperson. However, while an administrator is using that user system to interact with system 1416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1414 is any network or combination of networks of devices that communicate with one another. For example, network 1414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1412 might communicate with system 1416 using TCP/IP and, at a higher network level, use other common Internet protocols to communicate, such as HTTP, FTP, AFS, WAP, etc. In an example where HTTP is used, user system 1412 might include an HTTP client commonly referred to as a "browser" for sending and receiving HTTP messages to and from an HTTP server at system 1416. Such an HTTP server might be implemented as the sole network interface between system 1416 and network 1414, but other techniques might be used as well or instead. In some implementations, the interface between system 1416 and network 1414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1416, shown in FIG. 14, implements a web-based customer relationship management (CRM) system. For example, in one embodiment, system 1416 includes application servers configured to implement and execute CRM software applications as well as provide related data, code, forms, webpages and other information to and from user systems 1412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1416 implements applications other than, or in addition to, a CRM application. For example, system 1416 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1416.

One arrangement for elements of system 1416 is shown in FIG. 14, including a network interface 1420, application platform 1418, tenant data storage 1422 for tenant data 1523, system data storage 1424 for system data 1525 accessible to system 1416 and possibly multiple tenants, program code 1426 for implementing various functions of system 1416, and a process space 1428 for executing MTS system processes and tenant-specific processes, such as running applications as part of an application hosting service. Additional processes that may execute on system 1416 include database indexing processes.

Several elements in the system shown in FIG. 14 include conventional, well-known elements that are explained only briefly here. For example, each user system 1412 could include a desktop personal computer, workstation, laptop, PDA, cell phone, or any wireless access protocol (WAP) enabled device or any other computing device capable of interfacing directly or indirectly to the Internet or other network connection. User system 1412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1412 to access, process and view information, pages and applications available to it from system 1416 over network 1414. Each user system 1412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1416 or other systems or servers. For example, the user interface device can be used to access data and applications hosted by system 1416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1412 and all of its components are operator configurable using applications, such as a browser, including computer code run using a central processing unit such as an Intel Pentium® processor or the like. Similarly, system 1416 (and additional instances of an MTS, where more than one is present) and all of their components might be operator configurable using application(s) including computer code to run using a central processing unit such as processor system 1417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1416 to intercommunicate and to process webpages, applications and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1416 is configured to provide webpages, forms, applications, data and media content to user (client) systems 1412 to support the access by user systems 1412 as tenants of system 1416. As such, system 1416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 15:
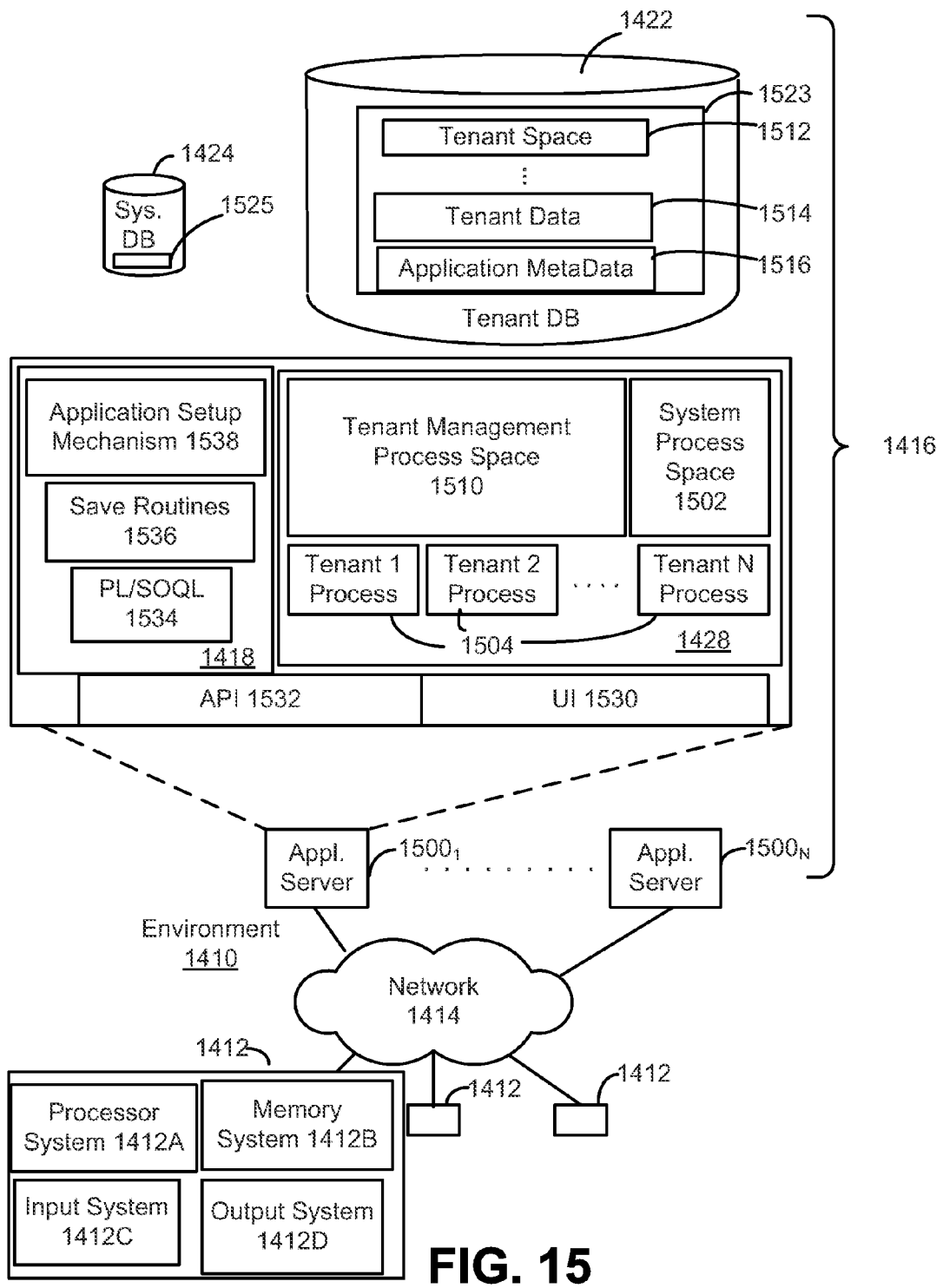
FIG. 15 shows a block diagram of an embodiment of elements of FIG. 14 and various possible interconnections between elements in an embodiment for method and system for answers to escalation.

FIG. 15 also illustrates environment 1410. However, in FIG. 15 elements of system 1416 and various interconnections in an embodiment are further illustrated. FIG. 15 shows that user system 1412 may include processor system 1412A, memory system 1412B, input system 1412C, and output system 1412D. FIG. 14 shows network 1414 and system 1416. FIG. 15 also shows that system 1416 may include tenant data storage 1422, tenant data 1523, system data storage 1424, system data 1525, User Interface (UI) 1530, Application Program Interface (API) 1532, PL/SOQL 1534, save routines 1536, application setup mechanism 1538, applications servers $1500_1$-$1500_N$, system process space 1402, tenant process spaces 1404, tenant management process space 1410, tenant storage area 1412, user storage 1414, and application metadata 1416. In other embodiments, environment 1410 may not have the same elements as those listed above and/or may have other elements instead of, or in addition to, those listed above.

User system 1412, network 1414, system 1416, tenant data storage 1422, and system data storage 1424 were discussed above in FIG. 14. Regarding user system 1412, processor system 1412A may be any combination of one or more processors. Memory system 1412B may be any combination of one or more memory devices, short term, and/or long term memory. Input system 1412C may be any combination of input devices, such as one or more keyboards, mice, trackballs, scanners, cameras, and/or interfaces to networks. Output system 1412D may be any combination of output devices, such as one or more monitors, printers, and/or interfaces to networks. As shown by FIG. 14, system 1416 may include a network interface 1420 (of FIG. 14) implemented as a set of HTTP application servers 1500, an application platform 1418, tenant data storage 1422, and system data storage 1424. Also shown is system process space 1402, including individual tenant process spaces 1404 and a tenant management process space 1410. Each application server 1500 may be configured to tenant data storage 1422 and the tenant data 1523 therein, and system data storage 1424 and the system data 1525 therein to serve requests of user systems 1412. The tenant data 1523 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1530 provides a user interface and an API 1532 provides an application programmer interface to system 1416 resident processes to users and/or developers at user systems 1412. The tenant data and the system data may be stored in various databases, such as one or more Oracle™ databases.

Application platform 1418 includes an application setup mechanism 1538 that supports application developers' creation and management of applications, which may be saved as metadata into tenant data storage 1422 by save routines 1536 for execution by subscribers as one or more tenant process spaces 1404 managed by tenant management process 1410 for example. Invocations to such applications may be coded using PL/SOQL 1534 that provides a programming language style interface extension to API 1532. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1416 for the subscriber making the invocation and executing the metadata as an application in a virtual machine.

Each application server 1500 may be communicably coupled to database systems, e.g., having access to system data 1525 and tenant data 1523, via a different network connection. For example, one application server $1500_1$ might be coupled via the network 1414 (e.g., the Internet), another application server $1500_{N-1}$ might be coupled via a direct network link, and another application server $1500_N$ might be coupled by yet a different network connection. Transfer Control Protocol and Internet Protocol (TCP/IP) are typical protocols for communicating between application servers 1500 and the database system. However, it will be apparent to one skilled in the art that other transport protocols may be used to optimize the system depending on the network interconnect used.

In certain embodiments, each application server 1500 is configured to handle requests for any user associated with any organization that is a tenant. Because it is desirable to be able to add and remove application servers from the server pool at any time for any reason, there is preferably no server affinity for a user and/or organization to a specific application server 1500. In one embodiment, therefore, an interface system implementing a load balancing function (e.g., an F5 Big-IP load balancer) is communicably coupled between the application servers 1500 and the user systems 1412 to distribute requests to the application servers 1500. In one embodiment, the load balancer uses a least connections algorithm to route user requests to the application servers 1500. Other examples of load balancing algorithms, such as round robin and observed response time, also can be used. For example, in certain embodiments, three consecutive requests from the same user could hit three different application servers 1500, and three requests from different users could hit the same application server 1500. In this manner, system 1416 is multi-tenant, wherein system 1416 handles storage of, and access to, different objects, data and applications across disparate users and organizations.

As an example of storage, one tenant might be a company that employs a sales force where each salesperson uses system 1416 to manage their sales process. Thus, a user might maintain contact data, leads data, customer follow-up data, performance data, goals and progress data, etc., all applicable to that user's personal sales process (e.g., in tenant data storage 1422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1416 might also maintain system level data usable by multiple tenants or other data. Such system level data might include industry reports, news, postings, and the like that are sharable among tenants.

In certain embodiments, user systems 1412 (which may be client systems) communicate with application servers 1500 to request and update system-level and tenant-level data from system 1416 that may require sending one or more queries to tenant data storage 1422 and/or system data storage 1424. System 1416 (e.g., an application server 1500 in system 1416) automatically generates one or more SQL statements (e.g., one or more SQL queries) that are designed to access the desired information. System data storage 1424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/816,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 14 and 15)

Figure 16:
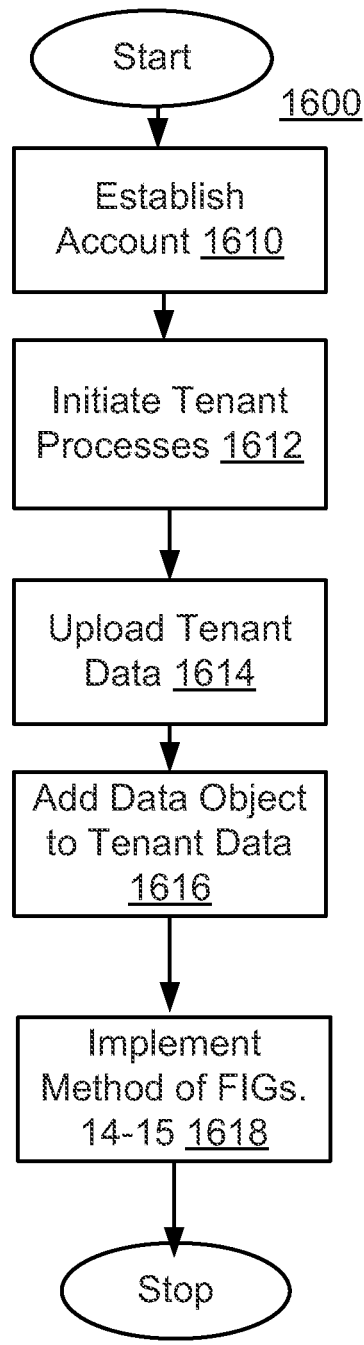
FIG. 16 shows a flowchart of an example of a method of using the environment of FIG. 14.

FIG. 16 shows a flowchart of an example of a method 1600 of using environment 1410. In step 1610, user system 1412 (FIGS. 14 and 14) establishes an account. In step 1612, one or more tenant process space 1504 (FIG. 15) are initiated on behalf of user system 1412, which may also involve setting aside space in tenant space 1512 (FIG. 15) and tenant data 1514 (FIG. 15) for user system 1412. Step 1612 may also involve modifying application metadata to accommodate user system 1412. In step 1614, user system 1412 uploads data. In step 1616, one or more data objects are added to tenant data 1514 where the data uploaded is stored. In step 1618, the methods associated with FIGS. 14-15 may be implemented. In another embodiment, although depicted as distinct steps in FIG. 16, steps 1602-1618 may not be distinct steps. In other embodiments, method 1600 may not have all of the above steps and/or may have other steps in addition to, or instead of, those listed above. The steps of method 1600 may be performed in another order. Subsets of the steps listed above as part of method 1600 may be used to form their own method.

Method for Creating the Environment (FIGS. 14 and 15)

Figure 17:
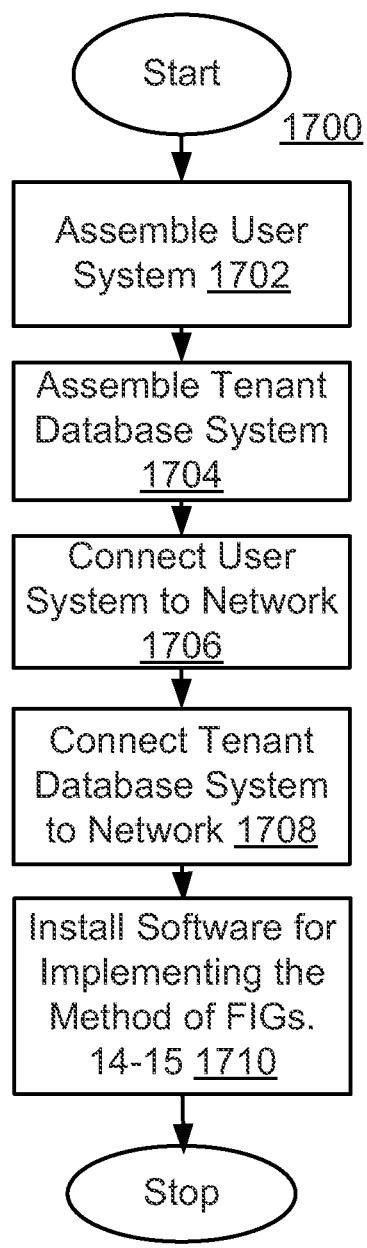
FIG. 17 is a method of making the environment of FIG. 14.

FIG. 17 is a method of making environment 1410, in step 1702, user system 1412 (FIGS. 14 and 15) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1704, system 1416 (FIGS. 14 and 15) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 1416 may include installing application platform 1418, network interface 1420, tenant data storage 1422, system data storage 1424, system data 1525, program code 1426, process space 1428, UI 1530, API 1532, PL/SOQL 1534, save routine 1536, application setup mechanism 1538, applications servers $100_1$-$100_N$, system process space 102, tenant process spaces 1504, tenant management process space 110, tenant space 1512, tenant data 1514, and application metadata 116 (FIG. 15).

In step 1706, user system 1412 is communicatively coupled to network 1504. In step 1708, system 1416 is communicatively coupled to network 1504 allowing user system 1412 and system 1416 to communicate with one another (FIG. 15). In step 1710, one or more instructions may be installed in system 1416 (e.g., the instructions may be installed on one or more machine readable media, such as computer readable media, therein) and/or system 1416 is otherwise configured for performing the steps of methods associated with FIGS. 14-15. In an embodiment, each of the steps of method 1700 is a distinct step. In another embodiment, although depicted as distinct steps in FIG. 17, steps 1702-1710 may not be distinct steps. In other embodiments, method 1700 may not have all of the above steps and/or may have other steps in addition to, or instead of, those listed above. The steps of method 1700 may be performed in another order. Subsets of the steps listed above as part of method 1700 may be used to form their own method.

Extensions and Alternatives

In the embodiment discussed in the specification, the voting of a like or dislike is not related to the article rating. In an alternate embodiment, the voting of liking/disliking an article may be related to the article rating. If a user system votes to like an article, then the minimum rating for the article can be set so that the user system cannot rate below the threshold. Similarly, when the user system votes to dislike an article, the maximum rating the article can receive from the user system can be set by the host system, above which the user system cannot rate the article.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method for analyzing search terms in a database system, the method comprising:
    tracking, over a first period of time, by a host system including one or more machines having a processor system having one or more processors, data received from a user system that includes at least one keyword searched in at least one database, the at least one keyword searched including a first category and a second category, the first keyword category being a word or phrase having provided successful retrieval of one or more articles, the second keyword category being a word or phrase associated with unsuccessful retrieval of one or more articles, the host system being part of the database system, the at least one database including a knowledge base associated with a community website, the knowledge base having a collection of articles related to problems and solutions related to common interests of a community, including documentation of knowledge and self-learning for reducing costs associated with a customer support system, the customer support system including customer records linking to articles of the knowledge base;
    determining, by the host system, for the at least one keyword searched at least: a quantity of how many times the keyword was searched, a quantity of how many times one or more articles with the keyword was viewed, and a quantity of how many votes for the one or more articles was received;
    aggregating, by the host system, the tracked data of the first period of time by at least summarizing the tracked data of the keyword searched, the aggregating including at least:
        sorting, by the host system, the tracked data of the first period of time according to the first keyword category capable of storing tracked data concerning the one or more articles successfully retrieved and the second keyword category capable of storing tracked data concerning the one or more articles unsuccessfully retrieved,
        adding, by the host system, the quantity of how many times the keyword was searched to the first keyword category of the tracked data of the first period of time,
        adding, by the host system, the quantity of how many times one or more articles with the keyword was viewed to the first keyword category of the tracked data of the first period of time,
        adding, by the host system, the quantity of how many votes for the one or more articles was received to the first keyword category of the tracked data of the first period of time,
    identifying, by the host system, previously tracked data of a second period of time, the second period of time having a greater duration than the first period of time, and
        combining, by the host system, the tracked data of the first period of time with the previously tracked data of the second period of time, the combined tracked data incorporating data from the first keyword category and the second keyword category of the first period of time, the combined tracked data being stored as the aggregated tracked data at the host system; and
    generating a report, by the host system, including information about the at least one keyword searched based on the stored aggregated tracked data.

2. The method of claim 1, the database system includes at least the knowledge base, which is a repository of articles and content related to solutions to customer issues, the at least one keyword searched having been searched for in the knowledge base.

3. The method of claim 1, tracking includes at least determining how many searches were conducted based on the at least one keyword.

4. The method of claim 1, tracking includes at least determining, by the host system, how many times a webpage with the at least one keyword was viewed.

5. The method of claim 1, tracking includes at least determining, host system, how many votes a webpage having an article with the at least one keyword were received.

6. The method of claim 1, the aggregating including at least aggregating, by the host system, keywords that were searched most often, the aggregating occurring on a daily basis.

7. The method of claim 6, the keywords that were searched most often are selected, by the host system, from keywords that retrieved at least an article.

8. The method of claim 6, further comprising:
    storing, by the host system, a case associated with users;
    associating, by the host system, articles with the case, the articles associated with the case being relevant to the case;
    determining, by the host system, articles that are stored in the knowledge base that are not associated with any case.

9. The method of claim 6, the at least one keyword that were searched the most include at least keywords that did not retrieve any article, therein indicating that the keywords are not retrieving the articles that were sought.

10. The method of claim 1, the aggregating includes at least monthly aggregating of daily aggregation data of the previous month.

11. The method of claim 1, the aggregating includes at least deleting, by the host system, older daily aggregation data.

12. The method of claim 1, aggregating, by the host system, the data over a first time period; and
aggregating by the host system, over a second time period that is longer than the first time period.

13. The method of claim 1, the aggregating includes at least yearly aggregating, by the host s stem of monthly aggregation data of a previous year.

14. The method of claim 1, the aggregating includes at least deleting, by the host system, older monthly aggregation data.

15. The method of claim 1, the at least one database includes at least a knowledge base, which is a repository storing content related to solutions to customer issues; the tracking includes at least:
determining, by the host system, how many searches were made for the at least one keyword;
determining, by the host system, an indication of how many times a webpage with the at least one keyword was viewed;
and
determining, by the host system, how many votes for a webpage having an article with the at least one keyword were received;
the aggregating includes at least:
aggregating, by the host system, the tracked data over a first time period, aggregating, by the host system, over a second time period that is longer than the first time period, the aggregating over the second time period including at least aggregating results of the aggregating over the first time period,
aggregating, by the host system, over a third time period that is longer than the second time period, the aggregating over the third time period including at least aggregating results of the aggregating over the second time period, and
the at least one keyword include at least:
keywords that were most often used in a search and that retrieved at least an article, and
keywords that were most often used in a search and that did not retrieve any article.

16. A method of claim 1, the storing of the aggregated tracked data includes storing the aggregated tracked data in a tabular format having at least columns for an organization identifier, an identifier for an object related to the tracking, an identifier of a type of tracking, a date of aggregation, a channel, a prefix to the identifier for an object related to the tracking, a count of a total number of searches, a count of a number of searches performed over a given time period, and an indication whether the aggregated tracked data stored is a daily aggregation or a monthly aggregation or a yearly aggregation; the prefix to the identifier for the object related to the tracking indicates a type of the object related to the tracking.

17. A method of claim 1, wherein the report generated can be displayed in a graphical format.

18. A machine comprising:
a processor;
a non-transient machine readable medium storing thereon one or more instructions for implementing a web application that includes one or more instructions that cause the processor to perform the method of claim 1.

19. A system comprising:
one or more machines having one or more processors operable to cause:
tracking, over a first period of time, by a host system including one or more machines having a processor system having one or more processors, data received from a user system that includes at least one keyword searched in at least one database, the at least one keyword searched including a first category and a second category, the first keyword category being a word or phrase having provided successful retrieval of one or more articles, the second keyword category being a word or phrase associated with unsuccessful retrieval of one or more articles, the host system being part of the database system, the at least one database including a knowledge base associated with a community website, the knowledge base having a collection of articles related to problems and solutions related to common interests of a community, including documentation of knowledge and self-learning for reducing costs associated with a customer support system, the customer support system including customer records linking to articles of the knowledge base;
determining, by the host system, for the at least one keyword searched at least: a quantity of how many times the keyword was searched, a quantity of how many times one or more articles with the keyword was viewed, and a quantity of how many votes for the one or more articles was received;
aggregating, by the host system, the tracked data of the first period of time by at least summarizing the tracked data of the keyword searched, the aggregating including at least:
sorting, by the host system, the tracked data of the first period of time according to the first keyword category capable of storing tracked data concerning the one or more articles successfully retrieved and the second keyword category capable of storing tracked data concerning the one or more articles unsuccessfully retrieved,
adding, by the host system, the quantity of how many times the keyword was searched to the first keyword category of the tracked data of the first period of time,
adding, by the host system, the quantity of how many times one or more articles with the keyword was viewed to the first keyword category of the tracked data of the first period of time,
adding, by the host system, the quantity of how many votes for the one or more articles was received to the first keyword category of the tracked data of the first period of time,
identifying, by the host system, previously tracked data of a second period of time, the second period of time having a greater duration than the first period of time, and
combining, by the host system, the tracked data of the first period of time with the previously tracked data of the second period of time, the combined tracked data incorporating data from the first keyword category and the second keyword category of the first period of time, the combined tracked data being stored as the aggregated tracked data at the host system; and
generating a report, by the host system, including information about the at least one keyword searched based on the stored aggregated tracked data.

* * * * *

UNITED STATES PATENT AND TRADEMARK OFFICE
CERTIFICATE OF CORRECTION

PATENT NO. : 9,223,852 B2
APPLICATION NO. : 13/070386
DATED : December 29, 2015
INVENTOR(S) : Francois Lopitaux et al.

It is certified that error appears in the above-identified patent and that said Letters Patent is hereby corrected as shown below:

IN THE CLAIMS:
Claim 5 (column 22, lines 48-49) change "at least determining, host system, how many votes" to
-- at least determining, by the host system, how many votes --.

Signed and Sealed this
Sixteenth Day of August, 2016

Michelle K. Lee
*Director of the United States Patent and Trademark Office*